(12) United States Patent
Nelke et al.

(10) Patent No.: US 9,465,825 B2
(45) Date of Patent: *Oct. 11, 2016

(54) DATA QUALITY MONITORING (71) Applicant: International Business Machines Corporation, Armonk, NY (US)

(72) Inventors: Sebastian Nelke, Schoenaich (DE); Martin Oberhofer, Bondorf (DE); Yannick Saillet, Stuttgart (DE); Jens Seifert, Gaertringen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,507

(22) Filed: Oct. 21, 2014

(65) Prior Publication Data

US 2015/0058280 A1 Feb. 26, 2015

Related U.S. Application Data (63) Continuation of application No. 13/537,406, filed on Jun. 29, 2012, now Pat. No. 9,092,468.

(30) Foreign Application Priority Data

Jul. 1, 2011 (EP) ..................................... 11172421

(51) Int. Cl.
*G06F 17/30* (2006.01)
*G06Q 10/10* (2012.01)

(52) U.S. Cl.
CPC ... *G06F 17/30303* (2013.01); *G06F 17/30563* (2013.01); *G06Q 10/10* (2013.01)

(58) Field of Classification Search
None
See application file for complete search history.

(56) References Cited

U.S. PATENT DOCUMENTS

| 7,505,868 | B1 | 3/2009 | Shan |
| 8,392,359 | B2 | 3/2013 | O'Donnell et al. |
| 8,762,333 | B2 | 6/2014 | McCline et al. |
| 2004/0138936 | A1 | 7/2004 | Johnson et al. |
| 2006/0224426 | A1 | 10/2006 | Goossens et al. |
| 2006/0238919 | A1 | 10/2006 | Bradley |
| 2007/0179939 | A1 | 8/2007 | O'Neil et al. |
| 2007/0239636 | A1 | 10/2007 | Tang et al. |
| 2008/0027958 | A1 | 1/2008 | Kapoor et al. |

(Continued)

FOREIGN PATENT DOCUMENTS

CN 1991652 A 7/2007

OTHER PUBLICATIONS

"Data record," http://www.businessdictionary.com/definition/data-record.html, (accessed Aug. 17, 2015).*

(Continued)

*Primary Examiner* — Richard Bowen
(74) *Attorney, Agent, or Firm* — Cantor Colburn LLP (57) ABSTRACT

A computer implemented method, computer program product and system for data quality monitoring includes measuring a data quality of loaded data relative to a predefined data quality metric. The measuring the data quality includes identifying delta changes in at least one of the loaded data and the data quality rules relative to a previous measurement of the data quality of the loaded data. Logical calculus defined in the data quality rules is applied to the identified delta changes.

9 Claims, 8 Drawing Sheets (56) References Cited

U.S. PATENT DOCUMENTS

| | | |
|---|---|---|
| 2008/0172269 A1* | 7/2008 | Senan et al. .................. 705/7 |
| 2008/0195430 A1 | 8/2008 | Rustagi |
| 2008/0275643 A1 | 11/2008 | Yaqub et al. |
| 2009/0006282 A1* | 1/2009 | Roth et al. .................. 706/12 |
| 2009/0006283 A1* | 1/2009 | Labrie et al. ................ 706/12 |
| 2009/0125553 A1 | 5/2009 | Dickinson |
| 2010/0010979 A1 | 1/2010 | Garfinkle et al. |
| 2010/0035598 A1 | 2/2010 | Lee et al. |
| 2010/0268447 A1 | 10/2010 | Griffiths |
| 2010/0280750 A1 | 11/2010 | Chen et al. |
| 2011/0238616 A1 | 9/2011 | Aggarwal et al. |
| 2012/0053954 A1 | 3/2012 | Whelchel et al. |
| 2012/0150820 A1 | 6/2012 | Sankaranarayanan et al. |
| 2013/0204525 A1 | 8/2013 | Pfeifle |
| 2014/0012498 A1 | 1/2014 | Gustafson et al. |

OTHER PUBLICATIONS

Chinese Office Action Mailed Aug. 15, 2014 for Application 201210225743.X; 9 pages.

* cited by examiner

DATA QUALITY MONITORING

PRIORITY

This application is a continuation application of the legally related U.S. Ser. No. 13/537,406 filed Jun. 29, 2012, which claims priority to European Patent Application No. 11172421.7, filed on Jul. 1, 2011, and all the benefits accruing therefrom under 35 U.S.C. §119, the contents of which are incorporated by reference herein in their entirety.

BACKGROUND

The present invention relates generally to data profiling during extract-transfer-load (ETL) processes, and more particularly, to data quality monitoring by running data quality rules and comparing them against previous data quality results to determine whether or not data quality has changed.

Data quality issues for data integration projects for master data management (MDM) systems, data warehousing (DW) systems, business application consolidation systems etc., are identified using data profiling techniques and/or data cleansing approaches in ETL processes. These issues are identified so that only high-quality data is loaded during the initial load phase of these systems. However, when data quality degrades in business applications, data quality issues become a cost factor for enterprises and may even break the business processes entirely. Periodically measuring the data quality using data quality rules is one way to detect the speed of degradation and/or the change of data quality over time. Periodic measuring may also be used as a prompt for an action if certain minimal required data quality key performance indicators (KPIs) are no longer being met. For MDM systems, a data governance (DG) program is established alongside the deployment of the MDM system to control the creation, maintenance and use of master data and master data quality throughout its life cycle. Data stewards working in the data governance organization apply data profiling measurements periodically in order to control compliance with data quality KPIs for the master data. A measurement is often done using semantic rules, which is one of many data profiling techniques. Data quality monitoring includes defining data quality KPIs, creating semantic rules, creating a first baseline measurement during initial load, periodically executing the semantic rules and comparing the results against a baseline result.

Data profiling and data quality monitoring are input/output (I/O) intensive and time consuming operations. Therefore, for data quality profiling and data quality monitoring, data is typically extracted into a staging area in order to avoid performance degradation of an application due to the additional I/O requirements of data extraction. In some instances applications do not allow direct access to the underlying database without using an application specific mechanism. Another reason that the data is extracted into a staging area is to avoid functional issues for the application due to structured query language (SQL) statement concurrency issues caused by conflicts between SQL created by the application and SQL created by the data profiling tool operating in the application database at the same time.

The initial full data extraction required for systems such as DW or business application consolidation often requires a full weekend, which may cause performance degradation of the application for an extended period of time due to the increased I/O requirements. For some systems it may be possible to periodically perform the extract over a weekend. For applications such as e-commerce systems which operate permanently, or for other critical systems, finding a good time to perform the data extract may be difficult. If data quality monitoring is not done, degradation of data quality will remain undetected until the business processes break down or other business issues arise.

Currently known data quality monitoring techniques process all the data that is in scope for the baseline measurement while it is performing additional measurements. The volume of data is also constantly growing and the time window between two measurements is shrinking. As a result, one measurement might not be complete by the time the next one is scheduled to begin which makes data quality monitoring difficult to perform.

BRIEF SUMMARY

Embodiments include a system, computer implemented method and computer program product for data quality monitoring. The data quality monitoring includes measuring a data quality of loaded data relative to a predefined data quality metric. The measuring includes identifying delta changes in at least one of the loaded data and the data quality rules relative to a previous measurement of the data quality of the loaded data. Logical calculus defined in the data quality rules is applied to the identified delta changes.

BRIEF DESCRIPTION OF THE SEVERAL VIEWS OF THE DRAWINGS

The accompanying drawings, which are incorporated in and constitute a part of this specification, illustrate several embodiments and together with the description, serve to explain the principles of the present invention. Embodiments of the invention are explained in detail referencing to the drawings.

DETAILED DESCRIPTION

Embodiments described herein monitor the quality of data over time by comparing a current data quality analysis result against a base line data quality result. In embodiments, in order to optimize the operational technique, the data profiling analysis is performed only on the delta changes of data, on the delta changes of quality rules and/or on a combination thereof. The data quality monitoring method is based on a change data capture (CDC) mechanism in embodiments, such as a transactional log based mechanism or trigger based replication, by exploiting cross-reference tables during delta loads. Columnar store techniques are used to minimize the execution time of data quality rules on data by a decomposition of the data quality rules, as well as minimizing additional memory by high compression and a propagation strategy based on the differentiation of operations of the quality rules.

Figure 1:
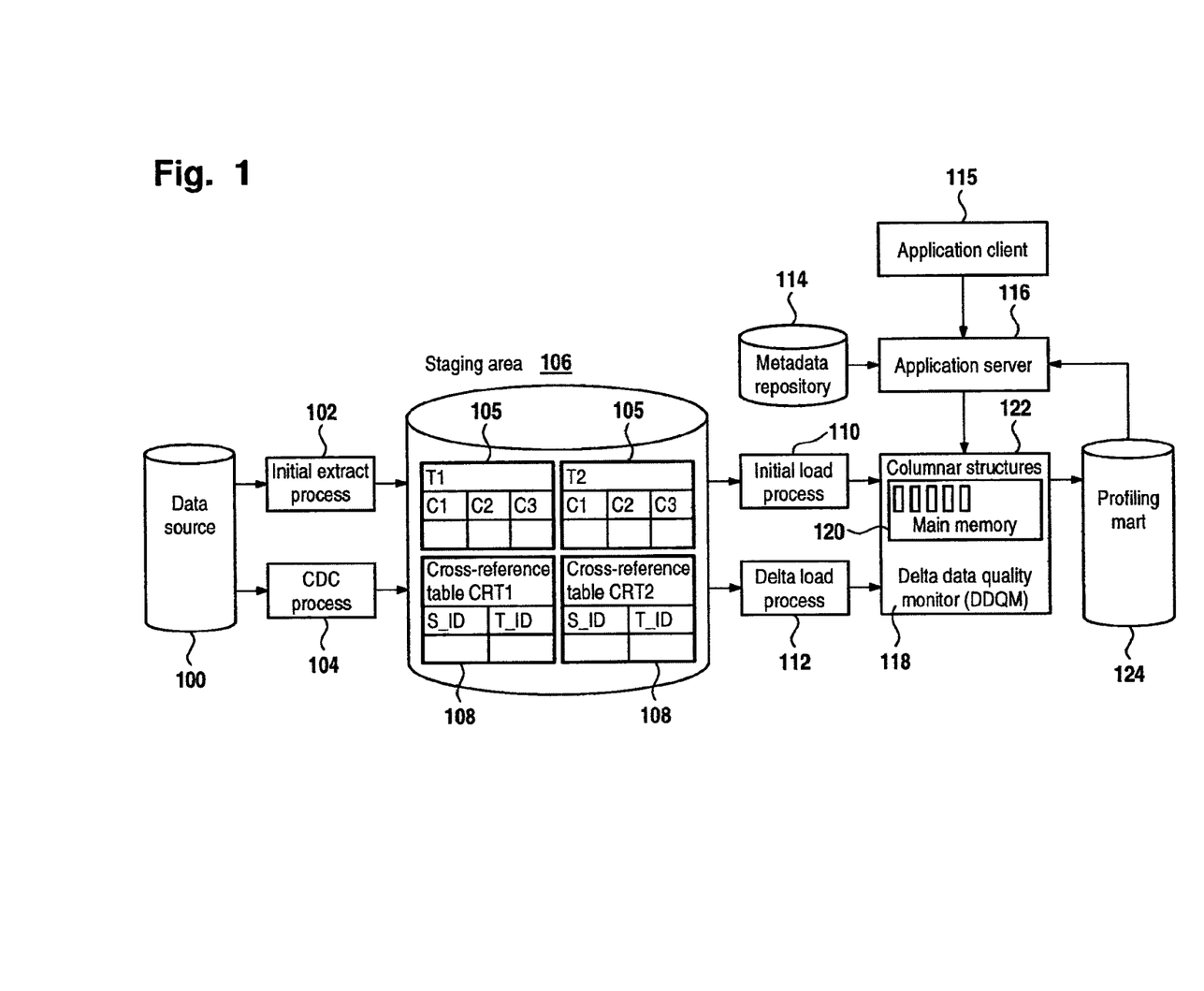
FIG. 1 is a block diagram depicting a system for performing data quality monitoring in an embodiment.

FIG. 1 illustrates a block diagram showing an exemplary embodiment of a system for data quality monitoring. The system includes a data source 100 from which data sets are extracted during an initial extract process 102 into a staging area 106. After creation of cross-reference tables 108, the transformed data sets are loaded during an initial load process 110 into columnar structures 122 in a main memory (e.g., random access memory or "RAM") 120 in a delta data quality monitor (DDQM) 118. There are two sets of columnar structures: a first set holds the data (referred to as data columns) and a second set holds intermediary results (referred to as column caches) of the data quality monitor. An application client 115 connects to the data profiling application which is deployed on an application server 116. The application client 115 is used to create and maintain the data quality rules executed by the DDQM 118. Metadata is stored in a metadata repository 114. The extraction, transformation and loading of the data sets define the extract-transfer-load (ETL) process which delivers the data that is monitored by the DDQM 118. The DDQM 118 delivers intermediary results of the quality measurement system. In an embodiment, the DDQM 118 is coupled to a profiling mart 124 in order to review time-stamped intermediary results of the quality measurement. This enables business resiliency against hardware failures and avoids the need to re-run all of the rules to instantiate the columnar structures 122 in main memory 120.

A change data capture (CDC) mechanism, CDC process 104, operates between the data source 100 and the staging area 106 to identify the delta changes that will be loaded using a delta load process 112. During the delta load process 112 a new set of operations is applied to the data in order to minimize the impact to columnar structures 122. The new process includes using data columns and column caches in the main memory 120. In an embodiment, the results of the delta quality monitoring performed by the DDQM 118 is visualized by using a data quality monitoring application deployed on application server 116 and invoked by the application client 115. The quality rules, which define a logical calculus to be applied to the data, are also stored and versioned in the metadata repository 114 which the application server 116 accesses to run on the main memory 120. The metadata repository 114 includes the columnar structures 122, including the data columns and the column caches. After the execution of the quality rules completes, the results of quality measurement are stored, and may be used at a later time for data trend analysis investigation in the profiling mart 124.

Figure 2:
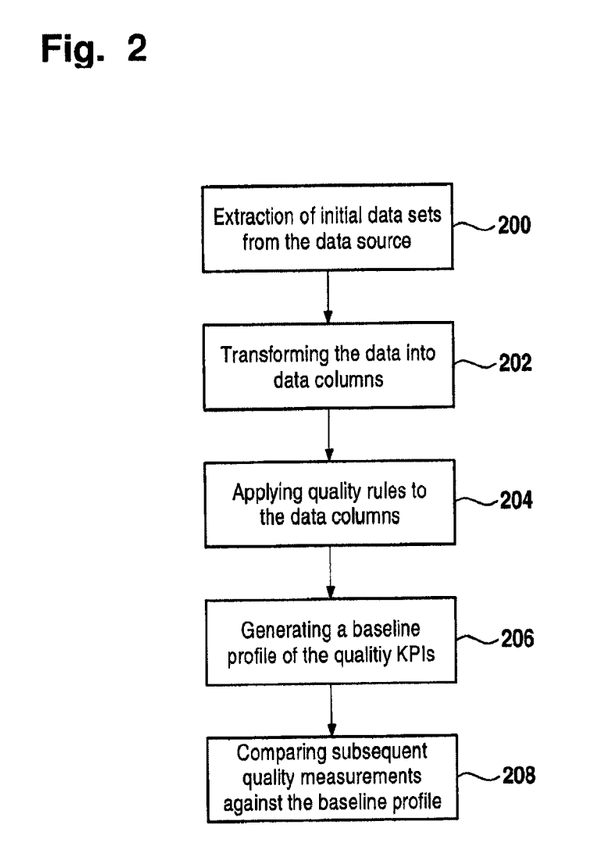
FIG. 2 is a flow chart depicting a first load of an initial data set that is extracted from a data source and loaded into the delta data quality monitor (DDQM) after transformation into a columnar format in main memory in an embodiment.

Referring now to FIG. 2, an embodiment of a process to perform a first data load to generate a baseline profile of quality key performance indicators (KPIs) is generally shown. A base key data quality metric is created by a first load of data. The first load of data is performed by extracting data sets from a data source at block 200. During the first ETL process, the initial data sets are transformed into data columns at block 202, and placed into the main memory 120. The terms of the quality rules are applied to the data columns at block 204, thereby generating a baseline profile 206 of the data quality KPIs which may be persisted in the data profiling mart 124. The data is persisted by triggering the data profiling application deployed on the application server 116 to store the data in the data profiling mart 124. Subsequent data quality monitoring processes compare subsequent measurements against the baseline profile at block 208.

Figure 3:
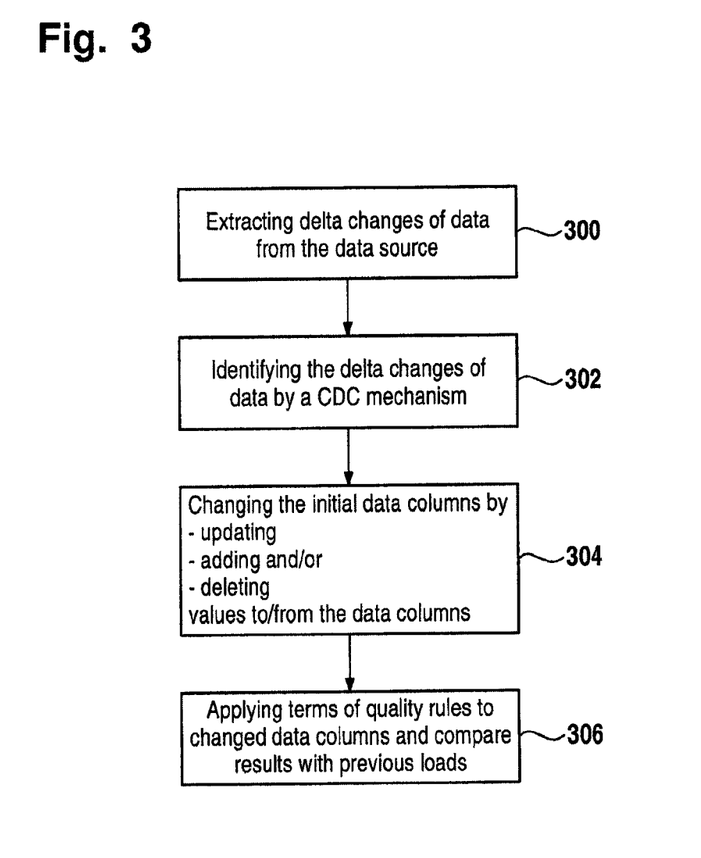
FIG. 3 is a flowchart depicting data quality of extracted and transformed delta changes measured relatively to the previous load in an embodiment.
Figure 4:
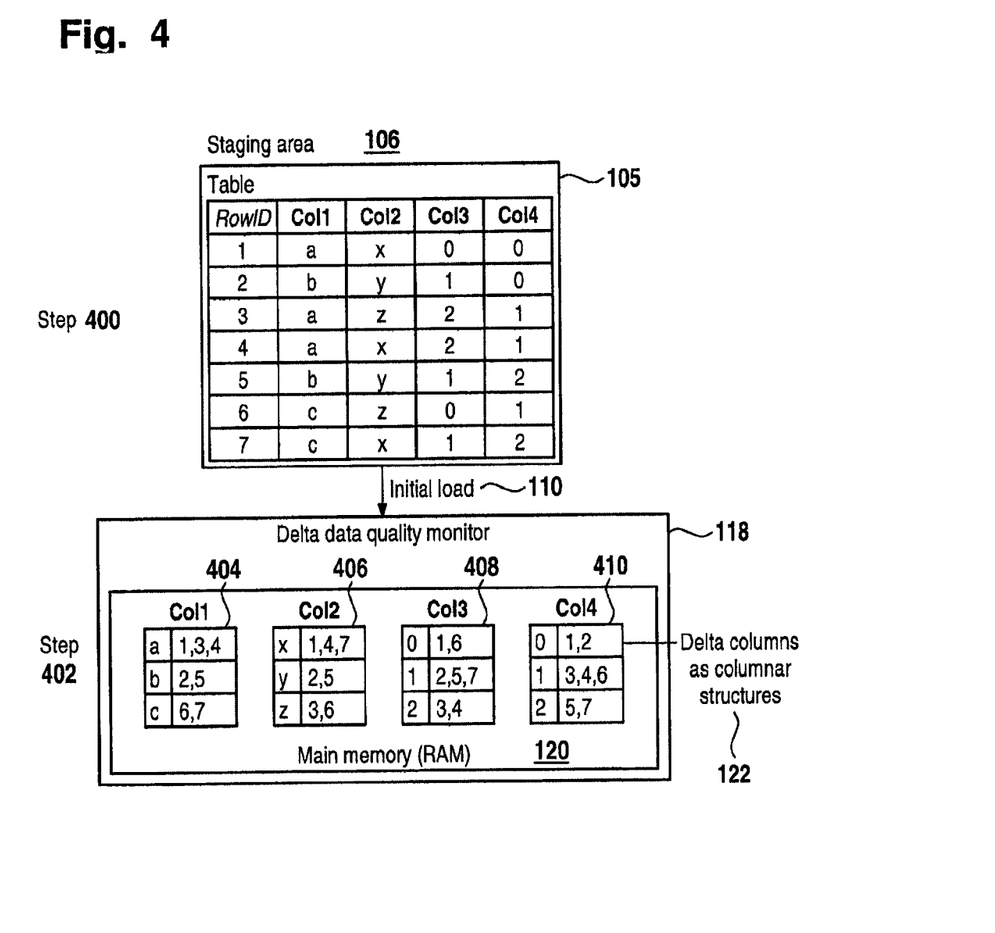
FIG. 4 is a diagram depicting data extracted from a data source that is transformed into a columnar format in the main memory in an embodiment.

FIG. 4 is a diagram depicting data extracted from a data source that is transformed into a columnar format in the main memory in an embodiment. In an embodiment, the data of FIG. 4 is checked for quality using a method such as the method disclosed in FIG. 3. FIG. 3 is a flowchart depicting data quality of extracted and transformed delta changes measured relatively to the previous load in an embodiment. In the subsequent delta loads only the delta changes (i.e., the differences from the baseline profile) of the data sets are extracted from the data source 100 at block 300. The delta changes of the extracted data are identified by the CDC process 104 at block 302. The data columns are updated based on the delta changes of the data sets by updating values in the data column, adding values to the data columns, and/or deleting values from the data columns at block 304. The data quality measurement of the delta changes of the data is calculated relative to the baseline profile for the data quality KPIs. The calculation is performed by applying the terms of the quality rules to only the data columns that have been affected by the delta changes of the extracted data. The calculation compares the actual results with the quality of the previous data loads at block 306.

The following drawings illustrate embodiments for evaluating quality rules on loaded data that is transformed into the columnar format. FIG. 4 depicts a data set with four columns at block 400, which are extracted in an initial load 110 from the data source 100. A transformation of the initial data set is performed in order to create the data columns 404, 406, 408, 410 in the main memory 120 of the DDQM 118. Each column is stored separately in a format containing an assorted list of all distinct values contained in the column for the whole data set. Each distinct value is associated with a list of row identifiers (IDs) for the rows that contain the value in the data set at block 402.

Figure 5:
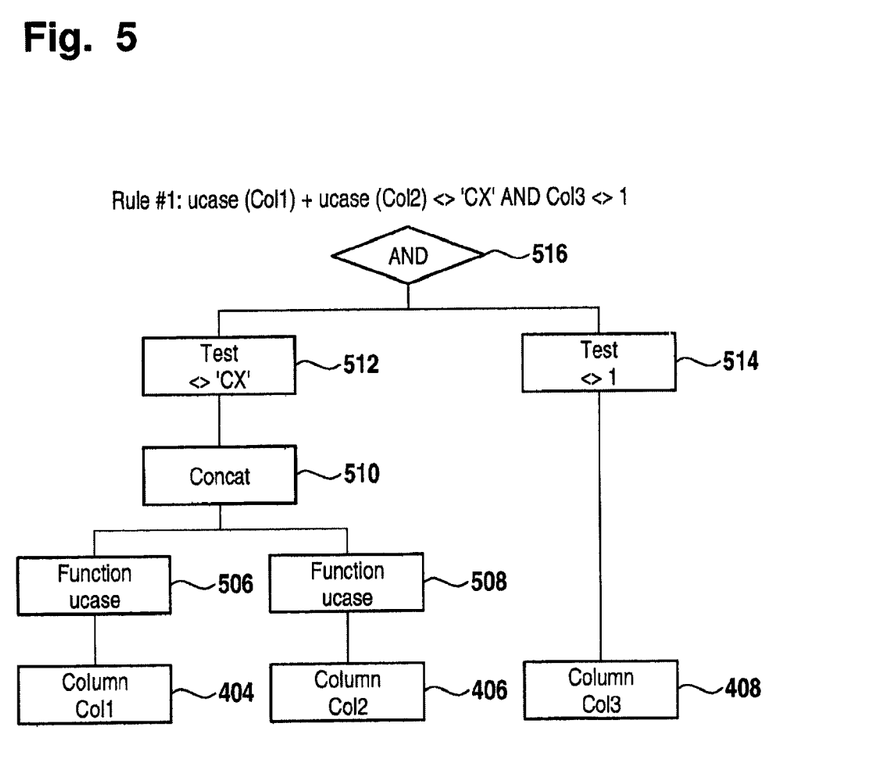
FIG. 5 is a diagram depicting a quality rule that is decomposed into its terms and generating a decomposition tree in an embodiment.

FIG. 5 depicts the execution of data quality management in accordance with an embodiment. As shown in FIG. 5, data quality management is executed by decomposing each quality rule into its single terms, which are then applied to the relevant data columns. The decomposition of the quality rules generates a tree of operations which may be functions, arithmetic operations, tests and/or Boolean operators.

Figure 6:
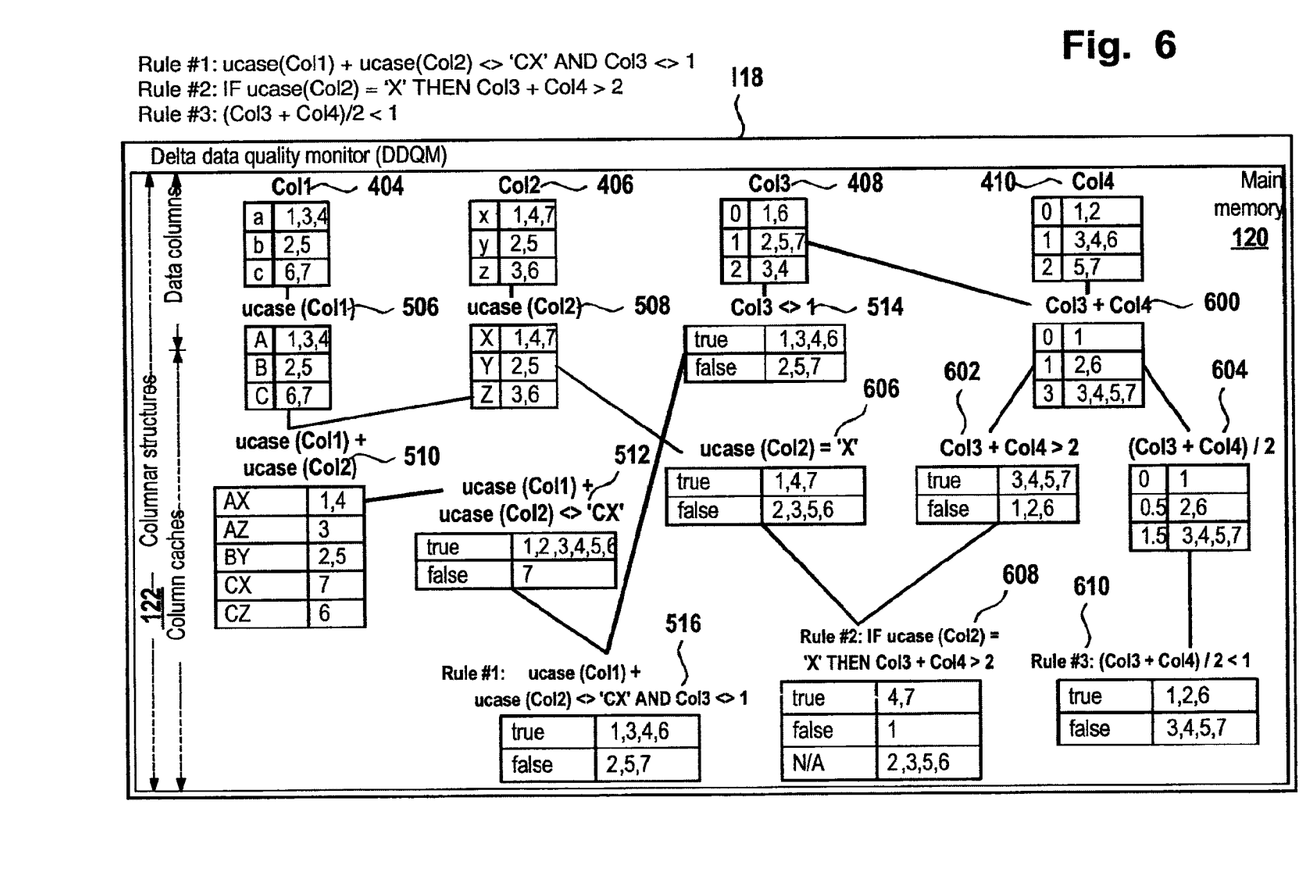
FIG. 6 is a diagram depicting the decomposition of a quality rule into its terms and applied to the data columns in the main memory in an embodiment.

FIG. 6 illustrates the execution of data quality management in an embodiment after three rules have been run for the initial data set, where each individual operation of a selected quality rule is executed on the dependent data columns. The evaluation for data quality management is done on the distinct values contained in the data columns and not on all values. FIG. 6 illustrates a columnar structure 122 that includes: data columns 404, 406, 408, 410 and column caches 506, 508, 510, 512, 514, 516, 600, 602, 604, 606, 608, 610.

Once an operation has been computed (e.g., a 'ucase(Col 1)' 506 in FIG. 6), the result of the operation is cached in a column cache in the main memory 120 in a similar format as the one that is used to store the data columns themselves. Cached operation results may be deleted and recomputed at any time without losing data. In addition, the cache operations may contain an internal 'unknown' value in the list of the distinct values that is used to store all of the row IDs for unknown values. In an embodiment, some values are unknown because some of the data values have changed. The cached result of tests (e.g., 'Col3<>1' 514 in FIG. 6) are built in a similar way as used in other operations, but the list of possible distinct values is limited to 'true', 'false', 'not applicable' or "unknown"

After all quality rule operations have been evaluated, the main memory 120 contains column structures 122 that include data columns and column caches and dependencies between the column caches as shown in FIG. 6. If the same operation of a quality rule is used in different quality rules or different places of the same quality rule, the operation is only computed once and an indication is made that several column caches are dependent on that rule. If the same quality rules are run several times and the data has not been changed, only the first run will take time to execute while the column caches are being built up in main memory 120. If neither data or rules changed, further execution of the quality rules will return the cached results, if still available, without any delay in the execution. This results in a reduction of needed resources and execution times. The column caches containing the intermediary results of operations of quality rules which haven't been used for a long time may be automatically deleted from the main memory 120 in order to prevent an increase in memory utilization. The deletion may be done using a time threshold or other more sophisticated aging algorithms.

Figure 7:
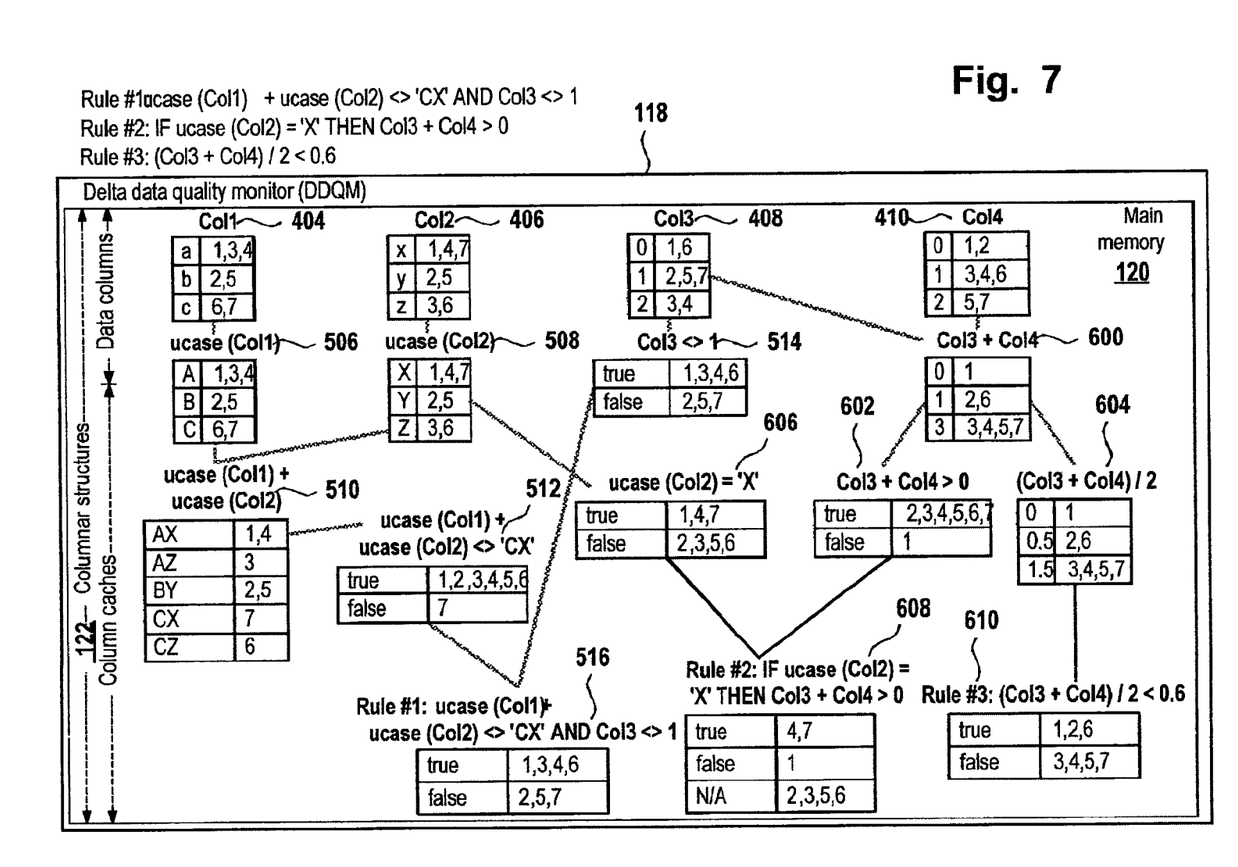
FIG. 7 is a diagram depicting a selective update or a recalculation of the main memory in an embodiment.

FIG. 7 depicts the results, in accordance with an embodiment, when a subset of terms of the quality rules is modified and the data set is unchanged. In the embodiment shown in FIG. 7, two quality rules have been slightly modified. Rule #2, which was previously "IF ucase(Col2)='X' THEN Col3+Col4>2" has been modified to "IF ucase(Col2)='X' THEN Col3+Col4>0" (i.e., the "2" in Rule #2 has changed to a "0"). Rule #3, which was previously "(Col3+Col4)/2<1" has been modified to "(Col3+Col4)/2<0.6" (i.e., the "1" in Rule #3 has changed to a "0.6"). In this case, the quality rules don't have to be re-evaluated completely. The only portion of the quality rules that need to be evaluated are the terms containing the new operations. In the embodiment depicted in FIG. 7, 'Col3+Col4>0' 602 and '(Col3+Col4)/2<0.6' 610 are new tests that have not been used before. Because they have not been previously used, the column caches have to be calculated. Both tests may still reuse the column caches containing the results for 'Col3+Col4' 600 and '(Col3+Col4)/2' 604 which were calculated before and are still accurate because the data have not changed. In an embodiment, data quality is measured quickly by applying only the modified terms of the quality rules to the data columns instead of evaluating the whole quality rules, because only the modified terms of the quality rules and their dependent column caches have to be recalculated.

Figure 8:
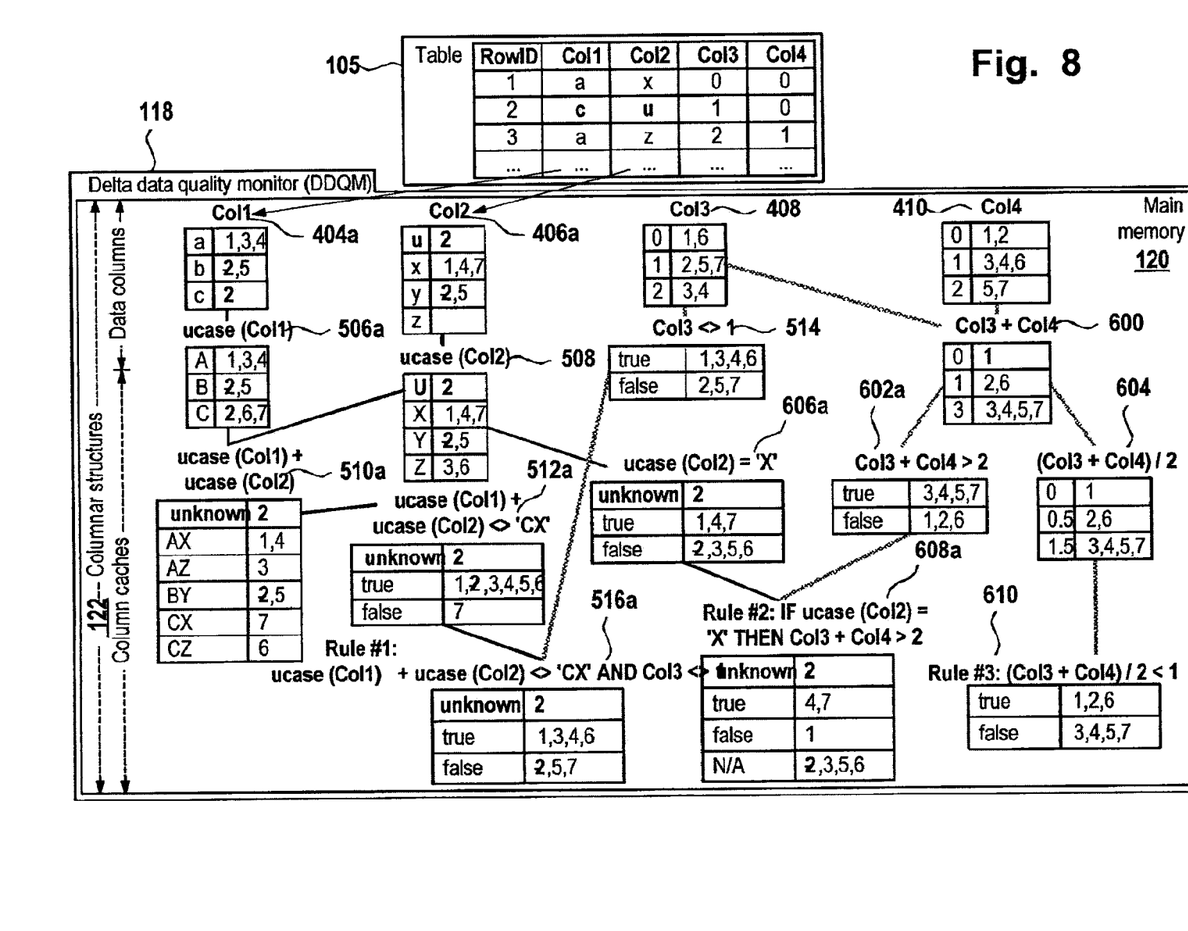
FIG. 8 is a diagram depicting the results of a data change of the extracted data in an embodiment.

FIG. 8 depicts the results when the same quality rules are executed on a modified data set in an embodiment. In an embodiment, the values of Col 1 404 and Col2 406 have been modified in row 2 by an update operation on the source table 400. When the delta changes are imported into the main memory 120 of the DDQM 118, the distinct values in Col 1 404 and Col 2 406 are updated (Col 1 row 2 has changed to a "c" and Col 2 row 2 has changed to a "u"). The update generates the updated data columns Col 1 404*a* and Col2 406*a*. For Col 1 404*a* the new value for row 2 is not a new distinct value, the change is simply a reassignment of the row ID 2 from the value B to the value C. For Col 2 406*a*, the new value of row 2 did not exist in the previous data column, therefore a new distinct value has to be created and the row ID 2 will be assigned to it.

The DDQM 118 stores the dependent relations between the data columns and the column caches containing the operations of the quality rules, thus storing the information about which column caches have to be updated or invalidated as a response to the modification of the loaded data. For scalar functions such as 'ucase(Col 1)' 506 and 'ucase (Col2)' 508 only the values of the column caches are updated. Therefore, only the new distinct values have to be applied to the single terms of the quality rules which shortens the calculation time. A modification of the column cache for 'ucase(Col 1)' 506*a* and 'ucase(Col 2)' 508*a* propagates a modification or invalidation to the column caches that depend on them. For a multi-column scalar operation such as 'ucase(Col 1)+ucase(Col 2)' 510*a*, the computation of the new value for row 2 may be more complex than for a simple scalar function because the same row IDs must be found in 'ucase(Col 1)' 506*a* and 'ucase (Col2)' 508*a* before the new concatenated value is computed. The main memory 122 of the DDQM 118 may simply decide to re-assign the row ID 2 to the special value 'unknown' indicating that the next time an execution of a quality rule requests this column cache, all row IDs assigned to the 'unknown' value having to be recomputed.

The update and/or invalidation of column caches containing operations of the quality rules propagate other updates and/or invalidations to other column caches that contain operations of the quality rules. In an embodiment, this update and/or invalidation propagation follows the dependency path as given by the decomposition tree of the data rule. If the immediate update of the dependent columnar cache is not possible, only the modified data values are marked as being 'unknown' and not the whole columnar cache. The column caches may remain in this partially unknown status until the next execution of a selected quality rule requires one of these column caches. When this happens, only the row IDs marked as 'unknown' have to be recomputed, therefore speeding up the evaluation of the values for all entries in the source data set.

In an embodiment when operations are aggregated, a change in the value of one row may result in re-computing the whole column cache that contains the operation with its dependent subordinate columnar caches having to be completely recomputed the next time the execution of a quality rule requires them. Performance is still improved however, because another rule change in the column cache will not be needed because the operations were aggregated.

Column caches containing operations of terms of the data quality rules which are not dependent on the modified data columns remain unchanged.

Minimal Effort Strategy for Updating Data Columns and Column Caches

In an embodiment, a minimal update strategy is used for updating data columns and column caches. As described above, when a cache becomes invalid due to the underlying data being changed, it will trigger all dependent caches to also become invalid. However, following the dependency graph and doing a re-computation of the cache and all its subsequent caches is cost and time intensive. Furthermore a re-computation of all the caches isn't always necessary and it may be possible to update only the single cache. In an embodiment, in order to determine whether an update on a cache is possible or a full re-computation is needed, it's necessary to differentiate operation categories. For the following examples, it is assumed that all expressions are decomposed so that only atomic expressions will remain.

Example: Col1+Col2+Col3=→(Col1+Col2)+(Col3)

Overview of operation categories and their scope in accordance with an embodiment:

| Operator category | scope | description | Examples |
|---|---|---|---|
| Scalar operations | Individual values of a data set | Operations that work on individual scalar values of exactly one data set. Constant values may be used | ucase(Col 1) sqrt(Col 2) abs(Col 1 * 19,5583) Col 1 + 10 Col 1/2.0 |
| Multi-column scalar operations | Individual values of multiple data sets. | Operations that work on individual scalar values of multiple data sets. Constant values may be used. | Col 1 + Col 2 trim(Col 1 + Col 2) Col 1/Col 2 Col 1 + Col 2 * 1,95583 |
| Aggregation operations | multiple/all values of a data sets | In contrast to scalar operations, aggregation operations don't work on individual values, instead they use the complete data set to calculate their results | min(Col 1) max(Col 2) avg(Col 1) median(Col 2) count(Col 3) |
| Multi column, multi value operations (set operations) | multiple/all values of multiple data sets | one value of a data set is depending on/related to one or many values of a different data set. Relationships between data tables and their check/lookup tables, Cartesian products. | Inner join left outer join |

In an embodiment, it is possible to determine whether it is possible to update the operation's cache or mark the complete cache as invalid and do a re-computation of all results based on the scope of data an operator category works on. The following table gives an overview of the update strategy taken on a cache in case the underlying data set has changed.

f=operation performed on the data set/value
v=value passed to the operation
RID=Row Id of the row affected by the operation

| | Cache update strategy for operator category | | | |
|---|---|---|---|---|
| Operation on data set | Scalar operations | Multi-column scalar operations | Aggregation operations | Multi column, multi value operations |
| Example | UCASE(col 1) | Col 1 + Col 2 | avg(Col 3) | Inner join |
| addNewValue | addNewValue(f(v)) or addRidToValue(RID, f(v)) | markInvalid(RID) | markAllInvalid( ) | markAllInvalid( ) |
| addRowIdTo Value | addRidToValue(RID, f(v)) | markInvalid(RID) | markAllInvalid( ) | markAllInvalid( ) |
| removeRowId | remove(RID, f(v)) | remove(RID, f(v)) | markAllInvalid( ) | markAllInvalid( ) |

Adding a New Value and Associated Row IDs to a Column

In an embodiment, for scalar operations the cache may be updated. If the new calculated value already exists in the cache the row ID for the new value needs to be added to the result value of the scalar operation on the new value. If the result value does not yet exist in the cache, it is added and linked to the new row ID.

In an embodiment, for multi-column scalar operations, the cache that contains the operation's result is not as easy to update as for scalar operations. The update is performed by flagging the row IDs being affected as invalid and recalculating the corresponding values the next time the cache is accessed.

In an embodiment, for aggregation and multi-column multi-value operations such as joins, for example, there is no straight forward way to update the cache. Therefore the complete cache is marked as invalid and is either recomputed immediately or the next time it is accessed.

Adding a New Row ID to an Existing Value in the Column

For scalar operations the cache may be updated by linking the new row ID to the result value of the scalar operation.

For multi-column operations, no easy cache update is possible so the corresponding row ID should be flagged as "invalid" and updated the next time the cache is accessed.

For aggregation and multi-column multi-value operations, the behaviour is the same as adding a new value. There is no straight forward way to update the cache so the complete cache is marked as invalid and it is either recomputed immediately or the next time it is accessed.

Remove a Row ID for an Existing Value in the Column

For scalar operations, the row ID is removed for the result of the scalar operation on the original value. If the result value has no associated row IDs the value can be removed from the column cache.

For multi-column scalar operations, the behavior is similar to scalar operations and the column store cache is corrected.

For aggregation and multi column multi value operations, the complete cache is marked as invalid and is either recomputed immediately or the next time it is accessed.

In an embodiment, the DDQM 118 may update column caches in the background if they do not belong to data quality rules that are being executing. This is determined by anticipating their needs according to a pre-set execution schedule.

In an embodiment, measuring the data quality KPIs and the comparison of them between two runs provides the ability to determine whether or not data quality increased or decreased over time. In an embodiment, the impact on application system performance is minimized and the time for performing data quality monitoring is shortened. An embodiment may overcome the problems in data profiling/quality monitoring currently existing in this field by performing the data quality analysis only on delta changes of data, only on delta changes of quality rules and/or on a combination thereof.

The embodiments provided describe only certain combinations of the various features discussed herein for purposes of clarity. It will be appreciated by those of ordinary skill in the art that various other combinations are evident to a skilled person studying this description.

While the foregoing has been with reference to particular embodiments, it will be appreciated by those skilled in the art that changes in these embodiments may be made to the embodiments.

What is claimed is:

1. A computer-implemented method for data quality monitoring, the method comprising:
   measuring, by a computer, a data quality of loaded data relative to a predefined data quality metric, wherein the loaded data is loaded from a data source that includes a data set comprising a plurality of elements, the measuring comprising:
      identifying delta changes in the loaded data and data quality rules relative to a previous measurement of the data quality of the loaded data;
      applying a logical calculus defined in the data quality rules to the identified delta changes;
      decomposing a selected quality rule into single terms and projecting the terms onto a tree structure with each node of the tree structure corresponding to one individual term of the selected quality rule;
      applying each individual data column to the tree structure resulting in an intermediary column cache for each node containing an intermediate result of a selected operation;
      updating, based on the delta change of the loaded data, the intermediary column cache of a node based on determining that the delta change of the loaded data affects content of the intermediary column cache of said node; and
      updating, based on the delta change of the data quality rule, the tree structure with the updated data quality rule and updating the intermediary column cache based on determining that the delta change of the data quality rule affects the content of the intermediary column cache of said node.

2. The computer-implemented method of claim 1 wherein a delta change of the data quality rules comprises at least one change in at least one term of at least one data quality rule, said at least one data quality rule containing a concatenation of terms, and the method further comprises:
   applying the changed term to one of:
      the loaded data; and
      the delta change of the loaded data.

3. The computer-implemented method of claim 1, further comprising identifying, using a change data capture mechanism, the delta changes of the loaded data.

4. A computer program product for data quality monitoring, the computer program product comprising:
   a computer readable storage medium having computer readable program code embodied therewith, the computer readable program code configured to perform:
   measuring a data quality of loaded data relative to a predefined data quality metric, wherein the loaded data is loaded from a data source that includes a data set comprising a plurality of elements, the measuring comprising:
      identifying delta changes in the loaded data and data quality rules relative to a previous measurement of the data quality of the loaded data;
      applying a logical calculus defined in the data quality rules to the identified delta changes extracting the data set;
      decomposing a selected quality rule into single terms and projecting the terms onto a tree structure with each node of the tree structure corresponding to one individual term of the selected quality rule;
      applying each individual data column to the tree structure resulting in an intermediary column cache for each node containing an intermediate result of a selected operation;
      updating, based on the delta change of the loaded data, the intermediary column cache of a node based on determining that the delta change of the loaded data affects content of the intermediary column cache of said node; and
      updating, based on the delta change of the data quality rule, the tree structure with the updated data quality rule and updating the intermediary column cache based on determining that the delta change of the data quality rule affects the content of the intermediary column cache of said node.

5. The computer program product of claim 4 wherein a delta change of the data quality rules comprises at least one change in at least one term of at least one data quality rule, said at least one data quality rule containing a concatenation of terms, and the computer readable program code is further configured to perform:
   applying the changed term to one of:
      the loaded data; and
      the delta changes of the loaded data.

6. The computer program product of claim 4, wherein the computer readable program code is further configured to perform:
   identifying, using a change data capture mechanism, the delta changes of the loaded data.

7. A system for data quality monitoring, the system comprising:
   a computer processor, the system configured to perform a method comprising:
   measuring a data quality of loaded data relative to a predefined data quality metric, wherein the loaded data is loaded from a data source that includes a data set comprising a plurality of elements, the measuring comprising:
      identifying delta changes in the loaded data and data quality rules relative to a previous measurement of the data quality of the loaded data;
      applying a logical calculus defined in the data quality rules to the identified delta changes;

decomposing a selected quality rule into single terms and projecting the terms onto a tree structure with each node of the tree structure corresponding to one individual term of the selected quality rule;

applying each individual data column to the tree structure resulting in an intermediary column cache for each node containing an intermediate result of a selected operation;

updating, based on the delta change of the loaded data, the intermediary column cache of a node based on determining that the delta change of the loaded data affects content of the intermediary column cache of said node; and updating, based on the delta change of the data quality rule, the tree structure with the updated data quality rule and updating the intermediary column cache based on determining that the delta change of the data quality rule affects the content of the intermediary column cache of said node.

8. The system of claim 7 wherein a delta change of the data quality rules comprises at least one change in at least one term of at least one data quality rule, said at least one data quality rule containing a concatenation of terms, and the method further comprises:

applying the changed term to one of:
the loaded data; and
the delta changes of the loaded data.

9. The system of claim 7, further comprising identifying, using a change data capture mechanism, the delta changes of the loaded data.

* * * * *